June 12, 1945.　　C. E. SORENSEN ET AL　　2,378,043
METHOD OF AIRFRAME ASSEMBLY
Filed Oct. 24, 1942　　4 Sheets-Sheet 1
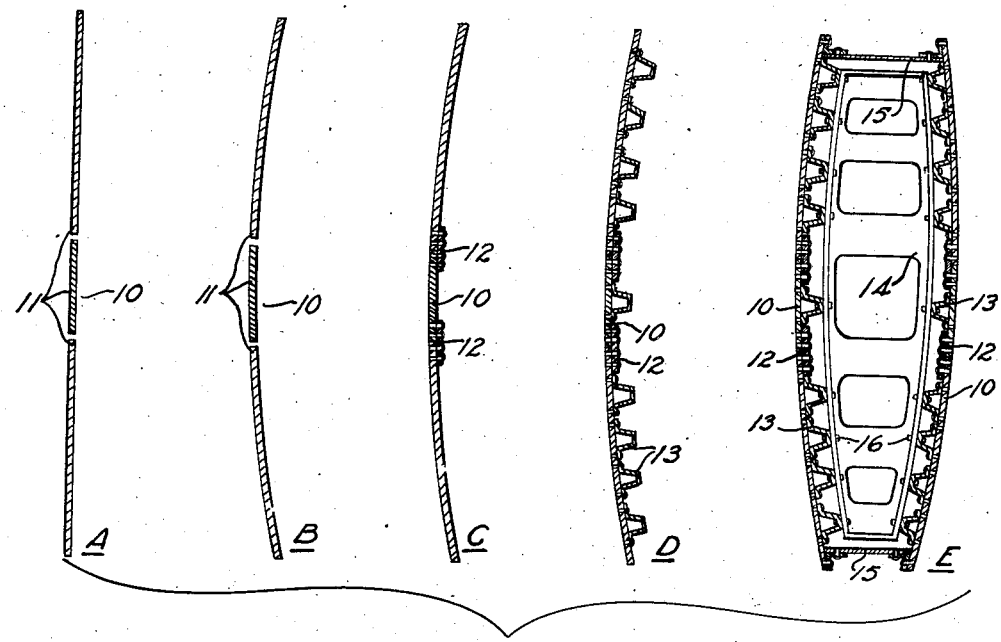
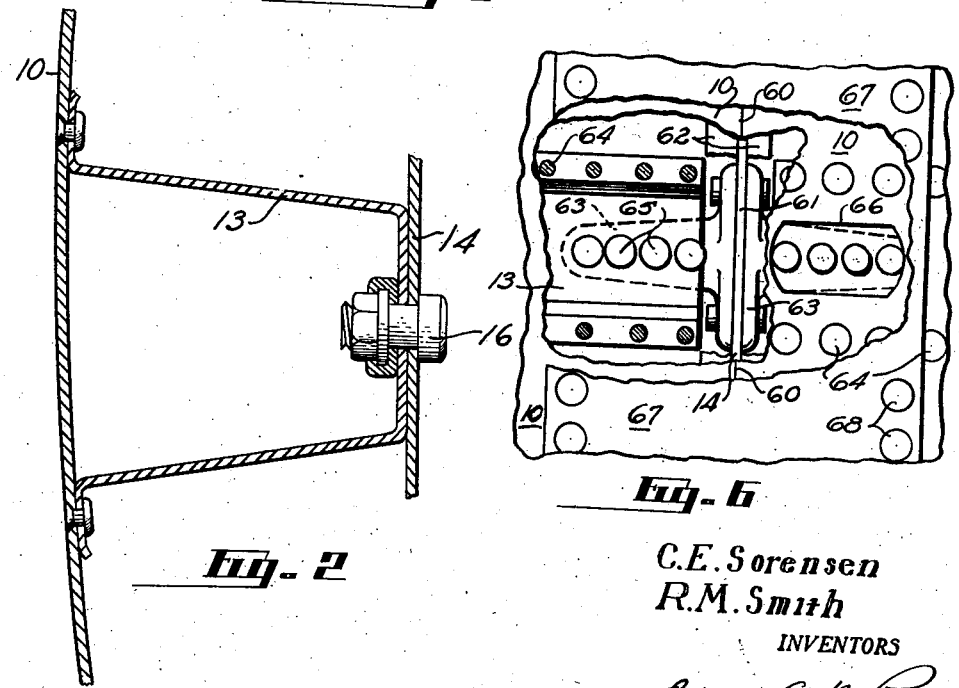
C. E. Sorensen
R. M. Smith
INVENTORS

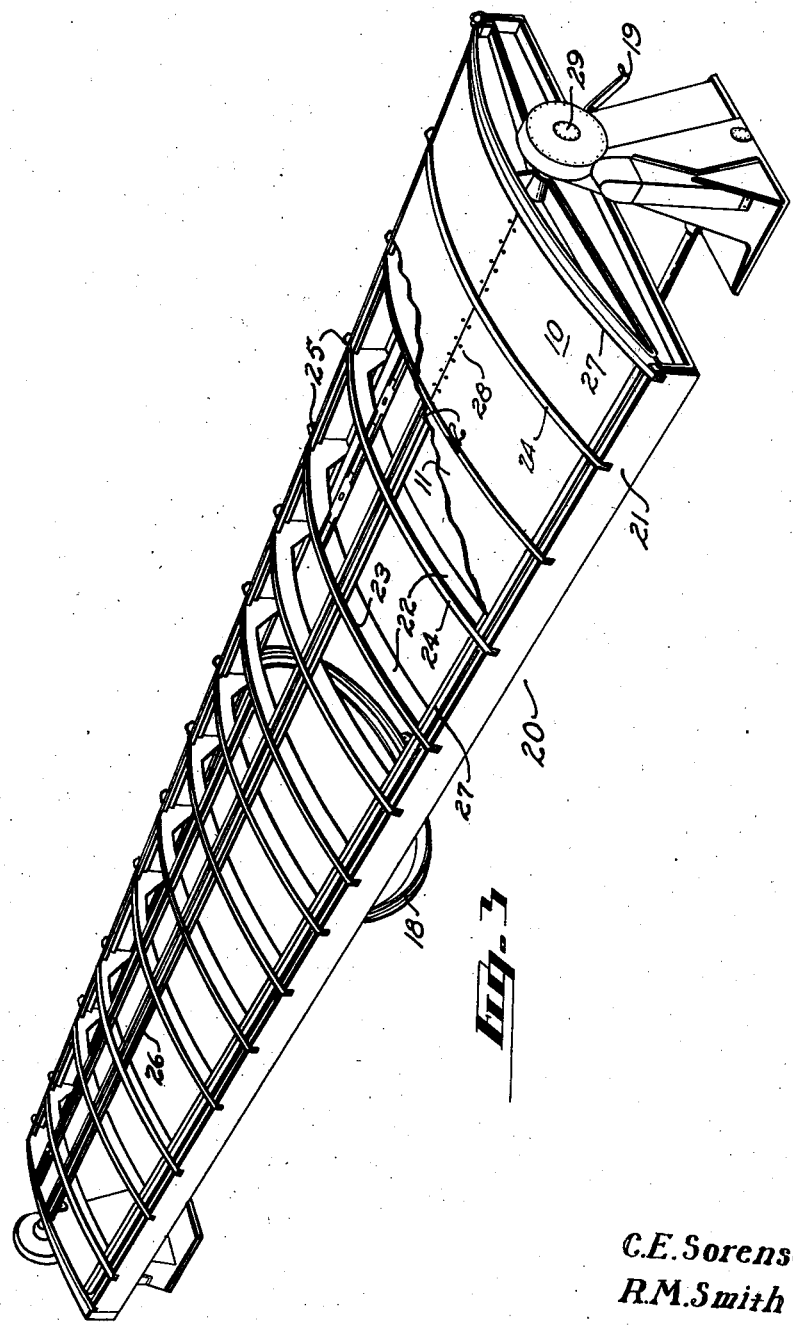

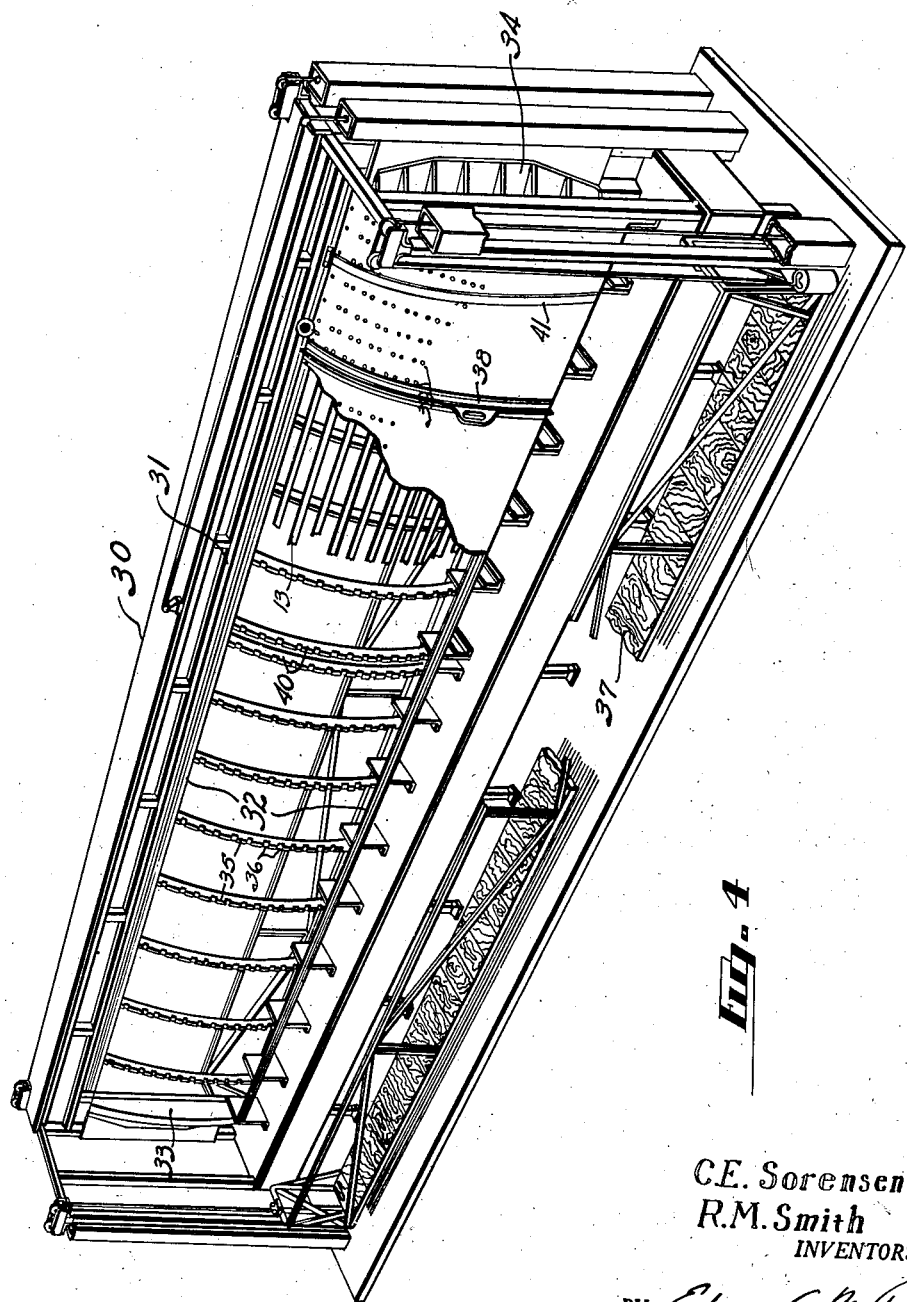

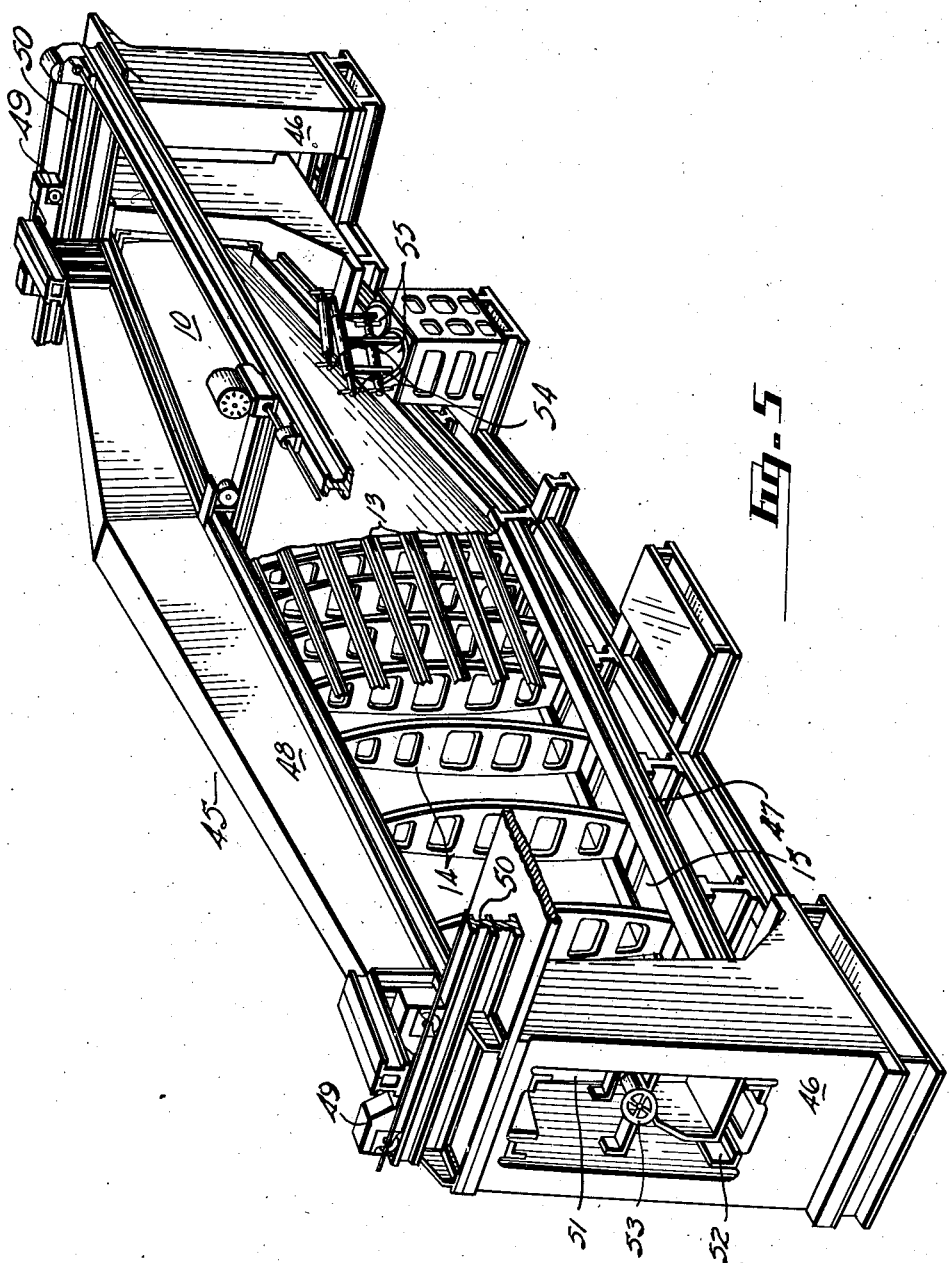

Patented June 12, 1945

2,378,043

UNITED STATES PATENT OFFICE 2,378,043

METHOD OF AIRFRAME ASSEMBLY

Charles E. Sorensen, Detroit, and Roscoe M. Smith, Ann Arbor, Mich., assignors to Ford Motor Company, Dearborn, Mich., a corporation of Delaware Application October 24, 1942, Serial No. 463,267

2 Claims. (Cl. 29—148.2)

This invention relates to aircraft manufacture; and, more particularly, to a method and apparatus for constructing wing members and the like for airplanes.

An object of this invention is to devise a construction method and apparatus by means of which it may be carried out to permit the speedy and accurate assembly of large aircraft components, notably wing sections. Another object of this invention is to break down the series of operations necessary to the construction of such sections into groups which may be completed independently and later assembled to form a finished structure. Yet another object of the invention is to set up components of the completed structure in such a way that the components themselves may be fabricated with a minimum of interference and instruction to the workers engaged on them. Another object of the invention is to devise an apparatus by the use of which overall limits measured in thousandths of an inch may be maintained in structures upwardly of 40 feet in length. The maintenance of such accuracy limits insures the production of a standard and interchangeable component throughout in which the many parts may be produced in quantity and assembled without cutting, fitting or other tailor work.

The growing complexity of aircraft construction, as exemplified by the present component— namely, an aircraft wing section—requires new methods and new approaches to permit the utilization of mass-production methods. While this component would superficially seem to be a relatively simple structure, the interrelationship of the spars, skin, stringers, bulkheads, splice plates and the thousands of rivets required to secure these elements in proper position would alone render the assembly a difficult task. When to these are added the numerous controls, attaching means, motor supports, landing gear trunnions and the like for which provision must be made, the problem is complicated. The principal difficulty arises from the riveting process as quarters are necessarily constricted, and the large numbers of rivets required—which run into many thousands—make the mere problem of access for the riveters a difficult one. However, access is not in itself enough as under the conditions obtaining in aircraft construction it is essential that the parts fit precisely prior to the driving of the rivets. The practice usually prevailing in other riveting operations which permit the drifting of components together to align the holes prior to riveting is not permissible in aircraft construction because of the stresses imposed thereby upon the skin. Similarly, since so many rivets are used, there will be a growth in the length of the object riveted due to the compression forces exerted on the rivets expanding against the material, unless provision is made therefor. This is by no means uniform, and steps must be taken to prevent it or hold it within uniform bounds on successive pieces if they are to be identical.

One of the advantages of the present method is that not only is a definite routine of operation established which permits the prediction with some accuracy of the results obtained therefrom, but also that operations are localized at each stage on the particular part of the work so that the influence thereof is not complicated by other factors. This, of course, is reflected equally in the fact that the work is that much more accessible for the operation to be performed on it at every step in the various operations.

With these and other objects in view the invention consists in the arrangement, construction and combination of the various parts of the improved device in the steps and methods disclosed, as described in the specification, claimed in the claims and illustrated in the accompanying drawings in which:

Figure 1 is a cross sectional view of the various components of an aircraft wing section showing the step-by-step assembly method.

Figure 2 is a sectional elevation on a larger scale showing the method of attaching the components.

Figure 3 is a perspective view of the skin assembly fixture.

Figure 4 is a perspective view of the skin and stringer assembly fixture.

Figure 5 is a perspective view of the wing assembly fixture.

Figure 6 is a plan view of the wing joint, successive skin layers being removed to show the construction in detail.

Referring to Figure 1, the essence of the steps of this invention is shown. As illustrated, the wing skin 10 is composed of three skin segments 11, cut to the proper size, as shown at A, to form the skin proper. They are then formed to the requisite degree of curvature, as shown at B, this curvature corresponding precisely to that which they will have in the finished wing. The segments 11 are then riveted together to form one large sheet by means of splice plates 12, as shown in C, thus forming the skin.

The skin so formed is then secured to a plurality of longitudinal stringers 13 by riveting, the stringers in this instance being hat shaped although any desired stringer section may be used as shown at D. To complete the assembly shown at E, a plurality of bulkheads 14 are secured between the spars 15, defining a wing skeleton. The skin 10 with its attached stringers 13 is then engaged with the bulkheads 14 and secured thereto by a bolt connection 16 at each point of intersection.

It will thus be seen that each operation has been localized in its particular sphere; that the riveting has all been done at steps in the process when access was not limited, while the final means of assembly by bolt does away with the need of backing up the rivets for these attachments. Figure 2 shows on an enlarged scale the attachment of the stringer 13 to the skin 10 and the assembly of the stringers to the bulkheads 14 by means of the bolt 16 which in this case is shown to be of the fixed-head type largely used in aircraft construction.

While the foregoing briefly describes the methods, it is best described with reference to the apparatus that has been developed for carrying out the various steps involved. Attention is now directed to Figure 3 which shows the fixture for the assembly of the skin proper. This fixture, designated by the reference character 20, comprises a frame 21 whose outline is substantially that of the skin to be assembled thereon. The frame has a number of cross members 22 (in this case fifteen in number) whose working faces 23 coincide with the curve of the finished wing surface. Associated with these cross members 22 are a number of retaining straps 24 which are fastened to one frame member adjacent each cross member and are releasably secured by a tensioning device 25 which is preferably in the form of a thumb screw or the like on the opposite longitudinal frame member. The entire frame is mounted on longitudinally disposed trunnions which permit it to be rotated to give access to every part upon which riveting is to be done. A number of auxiliary longitudinal members 26, which serve as splice plate supports, are provided.

In the operation of this fixture, the retaining straps 24 are pulled clear of the assembly area; the splice plates 12 are disposed along the splice plate supports 26, and the skin strips 11 are disposed on the supports over the splice plates and secured in place with their outer edges resting against the guide means 27 provided on the frame and their inner edges abutting. They are held in this position by the straps 24 which are reengaged in tensioning devices 25 and pulled tight across the assembled skin strips. The fixture may then be placed in a substantially vertical position and the skin strips 11 riveted to the splice plates 12, as indicated at 28, to form a completed wing covering. It will be noted that throughout means are provided for the proper alignment of skin strips at both the sides and ends; these are also provided for the locationing of the splice plates and the securing of the elements in proper relationship and curvature during the riveting operation with particular reference to the spaced cross members 22. The frame 21 is mounted on longitudinal trunnions 29 and the angular position may be changed and fixed as desired through the control 19. A center support 18 having rolling contact provides requisite rigidity.

Attention is now directed to Figure 4 as showing the apparatus for the next major step in the assembly. In this fixture, which is designated at 30, means are provided for the maintenance of proper relationship between the skin which has been fabricated in the fixture 20 and the stringers 13 during the process of riveting these components together. This fixture consists principally of a vertical frame 31 which outlines the sides and ends of the wing section built therein by means of the side bars 32 and the end plates 33. As the relative end alignment of the stringers is highly important, the end plates against which they abut are carefully reinforced for stiffness by constructions similar to that shown at 34. Extending between the two side bars 32 are a number of cross members 35 (again fifteen in number and conforming to the arrangement of the bars 22 of Figure 3) having a number of aligned recesses 36 to receive the stringers 13. As a matter of convenience, an elevating work stage 37 is provided so that the riveting crews on the work may occupy the most advantageous positions at all times. Straps 41 running from upper to lower bars 32 are provided to secure the skin against the stringers and as these straps are adjacent the cross members 35, they duplicate the forces imposed on the skin by the strap 24 in Figure 3.

In operation, the stringers 13 are inserted in the recesses 36 which establish the structural desired pattern that is duplicated in the arrangement of the recesses. The assembled skin 10 from fixture 20, supported in the cradles 38, is then brought forward and lowered into position on the outside of the stringers until aligned with the respective end plates 33 and side bars 32. At this stage, it is secured with respect to the fixture by straps 41, and the riveting of the skin to the stringers proceeds as indicated by the rivet strips 39. During this, the stages may be raised or lowered as required so that all riveting crews may work uniformly up or down the assembly to prevent localized distortion in it. Thus, the riveting may be carried on along successive horizontal reaches.

Inasmuch as the capacity of machines available for rolling skin stock to the desired curvature is limited, it is often necessary to make the wing itself in several transversely divided sections. These sections are not usually riveted on the transverse joints in the fixture 20, shown in Figure 3, though the entire skin section with transverse joints merely abutting is assembled in it. Similarly, as a matter of convenience to avoid the handling of too long a section, the stringers may also be made discontinuous to conform to the transverse wing spread and not assembled longitudinally until all of the components are brought together in the final assembly fixture. To permit this, it will be noted that intermediate the fixture 30 there are two cross members 40, which are stationed very closely together. The stringers in one end of the wing run between corresponding end plate and cross member 40 adjacent thereto, while those in the other end run from the other end plate to the other cross member 40. As will be explained more fully later, the ends of these stringers are provided with attaching forgings and these are properly located with respect to longitudinal extent of the wing by means of the cross members 40. It follows that when using the fixture 30 as shown, the wing is made up of two separate components which have, nevertheless, been assembled in fixed relationship to each other which they will later occupy when the entire component is brought together. This, as shown in Figure 6, occurs at the bulkhead 14, the wing stationing of the bulkheads and the position of cross members 22 and 35 being related throughout.

Referring now to Figure 5, th wing section assembly fixture 45 is shown. This fixture provides for the location and securing together of the spars 15, the bulkheads 14 and the previously assembled stringers 13 and skin 10.

The fixture 45 consists principally of two fixed end pillars 46, a fixed base 47 extending between the two pillars 46 and in plan conforming to the wing camber and a transversely movable bridge 48 also extending between the two pillars 46 and conforming to the wing camber. The bridge 48 is supported on the wheeled carriage 49 which runs on tracks 50 supported on the pillars 46 and extending transversely of the fixture 45. When the bridge 48 is directly positioned over the fixed base 47, the opposed faces of the bridge and base define the front and rear edges of the wing section to be assembled. Thereafter, the bridge 48 may be detached from the completed assembly and rolled transversely to clear the fixture and permit the vertical removal of the assembly.

Each end pillar 46 has a movable end plate support 51 slidably supported therein in the ways 52 and provided with adjusting means 53 to provide controlled movement longitudinally of the fixture. These end plate supports when brought into proper and predetermined position with respect to the pillars define the end surfaces of the wing assembly. It will thus be seen that these elements together define the sides and ends of the assembly to be made therein.

In operation, the movable bridge 48 is brought into predetermined proper alignment with the fixed base 47 as determined by indicia or a taper pin locator on the track 50, the same not being shown. The front and rear spars 15 are then placed in a fixed base 47 and movable bridge 48, respectively, and secured therein, it being apparent that they now occupy the same position that they will have in the completed assembly. The ends of the spars are then attached to the movable end plate supports which have been brought to the proper longitudinal position as determined by indicia or a taper pin locator on the ways 52, the same not being shown.

The bulkheads 14 are then placed between the two spars 15 and are sufficiently shorter than the space between the spars to permit their placement by angling them into position. They are then brought into proper longitudinal and transverse relationship to the station to be occupied with respect to the spars and riveted to them to complete the internal skeleton of the wing assembly.

An additional feature of the use of this fixture, although it forms no part of the present invention, is that a number of bulkheads may be prefabricated into a subassembly and this assembly itself then placed as a unit in the fixture. One illustrative use of this is in the case of the landing gear which is carried on trunnions supported on certain bulkheads. It is imperative that these trunnions occupy precisely the same relative position on each side of the ship and with respect to the fuselage to be attached to the wing thereafter. To accomplish this, the bulkheads involved are preassembled, using as a registry means the aforesaid trunnions. This subassembly is then brought to the fixture where the trunnions are engaged by a number of pins 54 on the rotatable stands 55, shown adjacent the fixture 45. These stands are provided with indicia or taper pin locators, which are not shown, and when the pins are engaged in the trunnions each stand is adjusted so that it occupies a predetermined position in which case necessarily the bulkhead assembly is also fixed in the assured position. Thereafter, it is secured to the spars as described above.

Inasmuch as the wing skeleton is now complete, the previously assembled skin and stringer assemblies are brought to the fixture 45 and lowered down and secured over the outer face of the bulkheads 14. In this position, the stringers 13 are in operative engagement with these bulkheads and are bolted therethrough, as shown in Figure 2 of the drawings, to complete the attachment of the skin thereto. As stated before, the skin and stringer assemblies are made in a number of sections because of the limitations imposed by metal working machines and handling of the assemblies, and at this point the end of the stringers of adjacent sections are secured together to complete the skin assembly. At the same time, the upper and lower edges of the skin are riveted to the spar angles which are available from either side and hence are accessible for riveting. This completes the assembly of the skin of one wing surface to the skeleton.

A simplified method of handling the assembly of independent skin-stringer components is illustrated in Figure 6, in which the two skins 10 abut on the line 60 overlying the bulkhead 14 which has the web 61 and flanges 62. Previously riveted to the bulkhead web 61 are opposed brackets 63 spaced therealong to correspond with locations of stringers 13 which are riveted at 64 to the skin segments. In assembly, the stringers 13 engage the brackets 63 and are riveted thereto at 65, a port 66 for access having been formed in the skin previously. The joint 60 between the skin components and the ports 66 on each side of the joint are then covered by the plate 67 which is riveted to the skin as at 68. With this arrangement, the bracket rivets 65 are available for bucking to insure adequate strength in the joint.

Depending upon the size of the components, insofar as this is reflected in the accessibility of the interior of the wing to workmen required to fasten the attaching bolts 16, the same procedure may be repeated with the other wing surface to complete the enclosure. In large ships there is usually adequate room to effect this, and since only a minimum number of bolts needs to be secured rather than a large number of rivets, it presents no particular difficulty. In the smaller craft there may be insufficient room and, in such cases, the method usually followed in handling this type of work is to fasten top and bottom strips rather than the complete skin section to the bulkheads, leaving an open center permitting access for fastening of these strips through. Thereafter the center strip is rolled down and fastened through the open portion left ahead. Or as an alternative, the bulkheads and spars may be set up in fixture 45 and the stringers on one side bolted thereto. The skin may then be riveted to the stringers while in the fixture, thus completing one side. The second side may then be preformed and applied as described above.

After the two skin surfaces have been attached to the bulkheads and spars, the end plates may be moved outwardly, thus clearing the component, and the bridge 48 moved transversely. The entire component may then be lifted by crane or other means and removed from the fixture for further processing and assembly to other components.

The use of fixtures of the type shown permits the employment of master checking means through which the similarity of these fixtures to others designed to do the same work may be definitely established and maintained. It further permits a single device for each major operation for assembling the parts in registry and holding them securely during the work processes. It further provides control during all assembly steps of the important dimensions of the component. At the same time it permits a routine assembly operation to be evolved in which the various steps can be taken systematically and in order rather than haphazardly as heretofore.

The advantage in the method is primarily the accessibility during the several operations which contrasts markedly with previous methods. The advantage, from the standpoint of production, is that the work is carried on at a number of different stations allowing a maximum number of men to be employed at each particular position, hence keeping up the rate of manufacture accordingly. Another advantage is that, due to standards of interchangeability maintained, a large amount of the preliminary stamping and reaming of the rivet holes and similar machine operations may be carried out with production tools rather than by hand as has been required up to now.

Throughout this specification and claims, the words "rivets" or "riveting" are used to describe a permanent fastening means or process. It should be understood that these include welding processes as well since the conditions of application of both, as to requirements of access and effect on the physical structure are comparable in many respects and the method contemplates the use of either process Some changes may be made in the arrangement, construction and combination of the several parts comprising the improved device and the steps and methods disclosed without departing from the spirit of the invention and it is the intention to cover by the claims such changes as may be reasonably included within the scope thereof.

The invention claimed is:

1. The method of constructing an airframe wing component, comprising a thin metallic skin and longitudinal metallic stringers and transverse bulkheads, which comprises the steps of preforming and prefabricating said skin from a plurality of skin sections to the required outline and contour of said component, supporting said stringers in a pattern conforming to the outline and contour of said component, placing said prefabricated skin on said stringers so arranged, riveting said skin to said stringers to form a skin panel, fabricating the internal structure of said component from said bulkheads while fixedly supported, applying said skin panel to said internal structure while so supported and securing said panel to said framework by bolting said stringers to said bulkheads.

2. The method of assembling metal airframe wing components, comprising a surface skin and longitudinal stringers supporting the inner surface of said skin and transverse internal bulkheads securing said stringers and longitudinal spar members which comprises the steps of preforming, in plan and contour, thin metal sheets designed to constitute said skin, arranging said preformed sheets to conform to the outline and contour of said component, supporting said arranged sheets at a plurality of spaced transverse areas thereof, permanently securing said plurality of preformed sheets together while so arranged and supported to form said skin, fixing said stringers according to the predetermined pattern conforming to the outline and contour of said component, supporting said stringers at spaced intervals therealong, placing said skin on said stringers so fixed and supported, permanently securing said skin thereto, forming a skin panel, fixedly supporting said bulkheads and spars and permanently securing them together to form the framework of said component, placing said skin panel on said framework while so supported, so that said spaced transverse areas on said skin and said spaced intervals on said stringers substantially correspond to the arrangement of said bulkheads, bolting said stringers to said bulkheads at their respective points of intersection, and permanently securing said skin panel adjacent its edges to said spars.

CHAS. E. SORENSEN.
ROSCOE M. SMITH.